United States Patent
Kim (10) Patent No.: US 11,637,622 B2
(45) Date of Patent: Apr. 25, 2023

(54) APPARATUS AND METHOD OF SETTING GAIN OF RF REPEATER USING SYNCHRONIZATION SIGNAL

(71) Applicant: SK TELECOM CO., LTD., Seoul (KR)

(72) Inventor: Moon Hong Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 9 days.

(21) Appl. No.: 17/286,523

(22) PCT Filed: May 27, 2020

(86) PCT No.: PCT/KR2020/006809
§ 371 (c)(1),
(2) Date: Apr. 19, 2021

(87) PCT Pub. No.: WO2021/006478
PCT Pub. Date: Jan. 14, 2021

(65) Prior Publication Data
US 2021/0359748 A1    Nov. 18, 2021

(30) Foreign Application Priority Data
Jul. 9, 2019   (KR) .......................... 10-2019-0082468

(51) Int. Cl.
*H04B 7/155* (2006.01)
*H04W 52/22* (2009.01)
*H04W 56/00* (2009.01)

(52) U.S. Cl.
CPC ..... *H04B 7/15578* (2013.01); *H04B 7/15557* (2013.01); *H04W 52/225* (2013.01); *H04W 56/001* (2013.01)

(58) Field of Classification Search
None
See application file for complete search history.

(56) References Cited

U.S. PATENT DOCUMENTS

2012/0113834 A1* 5/2012 Hunzinger ......... H04B 7/15535
370/252
2013/0244683 A1* 9/2013 Fukumasa ............. H04W 40/12
455/452.2

(Continued)

FOREIGN PATENT DOCUMENTS

EP          3471296      4/2019
KR    10-2006-0019469    3/2006

(Continued)

OTHER PUBLICATIONS

International Search Report dated Aug. 28, 2020 issued in Application No. PCT/KR2020/006809.

(Continued)

*Primary Examiner* — Chirag G Shah
*Assistant Examiner* — Amarnauth G Persaud
(74) *Attorney, Agent, or Firm* — Ked & Associates, LLP (57) ABSTRACT

The present disclosure provides an apparatus for setting a gain of a RF repeater includes: a synchronization signal power calculator configured to determine an average received power level of a synchronization signal received over a predetermined number of times as a synchronization signal power; a downlink power calculator configured to calculate a downlink input power according to a power ratio of synchronization signal to data channel signal based on the synchronization signal power; and a downlink gain setting unit configured to calculate a downlink gain by subtracting the downlink input power from a downlink output power determined by hardware specifications to set the downlink gain.

12 Claims, 9 Drawing Sheets

(56) References Cited

U.S. PATENT DOCUMENTS

| | | | | |
|---|---|---|---|---|
| 2015/0092691 A1* | 4/2015 | Hwang | ................ | H04L 5/0048 |
| | | | | 370/329 |
| 2017/0012696 A1* | 1/2017 | Jang | .......................... | H03F 3/19 |
| 2018/0026731 A1* | 1/2018 | Kim | ..................... | H04B 17/318 |
| | | | | 455/11.1 |
| 2019/0207669 A1* | 7/2019 | Cook | ................... | H04B 17/318 |
| 2020/0037385 A1* | 1/2020 | Park | ...................... | H04W 76/18 |
| 2021/0266776 A1* | 8/2021 | Wu | ....................... | H04L 5/0048 |

FOREIGN PATENT DOCUMENTS

| | | |
|---|---|---|
| KR | 20-0425602 | 9/2006 |
| KR | 10-1243333 | 3/2013 |
| KR | 10-2014-0081501 | 7/2014 |
| KR | 10-1470441 | 12/2014 |
| KR | 10-2019-0013621 | 2/2019 |

OTHER PUBLICATIONS

Extended European Search Report dated Aug. 5, 2022 issued in Application No. 20772193.7.

* cited by examiner

FIG. 1A

FDD

FIG. 1B

TDD

FIG. 2

<38.211 - Table 4.3.2-3: Slot formats>
D: Downlink, U: Uplink, X: Flexible

| Format | \multicolumn{14}{c}{Symbol Number in a slot} |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |

FIG. 3

| | | | | | | | | | | | | | | |
|---|---|---|---|---|---|---|---|---|---|---|---|---|---|---|
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | X | D | X | X | X | X | X | X |
| 50 | X | U | U | U | U | U | U | | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | U | U | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | U | U | U | U | U | D | X | U | U | U | U | U |
| 60 | D | X | X | X | X | X | U | D | X | X | X | X | X | U |
| 61 | D | D | X | X | X | X | U | D | D | X | X | X | X | U |
| 62-255 | | | | | | | | | | | | | | |

FIG. 4

| D(#0) | D(#0) | D(#0) | S(#32) | U(#1) |
|---|---|---|---|---|

FIG. 5

FIG. 6A
FDD

FIG. 6B
TDD

APPARATUS AND METHOD OF SETTING GAIN OF RF REPEATER USING SYNCHRONIZATION SIGNAL

CROSS-REFERENCE TO RELATED PATENT APPLICATIONS

This application is a U.S. National Stage Application under 35 U.S.C. § 371 of PCT Application No. PCT/KR2020/006809, filed May 27, 2020, which claims priority to Korean Patent Application No. 10-2019-0082468, filed Jul. 9, 2019, whose entire disclosures are hereby incorporated by reference.

TECHNICAL FIELD

The present disclosure relates to a RF repeater and, more particularly, to an apparatus and method of setting a gain of the RF repeater using a synchronization signal.

BACKGROUND

In a fifth generation (5G) network which is a next generation mobile communications network, a ultra-wideband, ultra-low delay, and super-multiple access technologies are required to provide differentiated services compared to existing mobile communications network. Specifically, in the 5G mobile communications network, cell engineering that minimizes coverage holes is required, so that quality of services guaranteeing ultra-high-definition (UHD) level content services should be provided to a mobile terminal such as a tablet PC anywhere and seamless mobile communications services should be provided to fast-moving devices such as a connected car and an autonomous car. In addition, considering the various use cases of massive IoT services, the 5G services should be provided to various sites where IoT terminals exist. The 5G services are expected to spread in most areas, including indoors and outdoors, while addressing these diverse requirements.

Figure 1A:
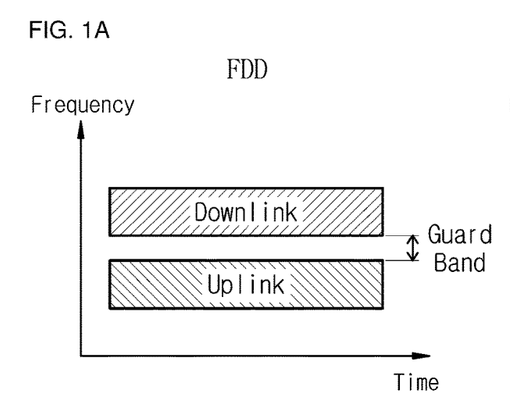
FIGS. 1A and 1B illustrate duplex modes in communications between a base station and a terminal in a mobile communications system.
Figure 1B:
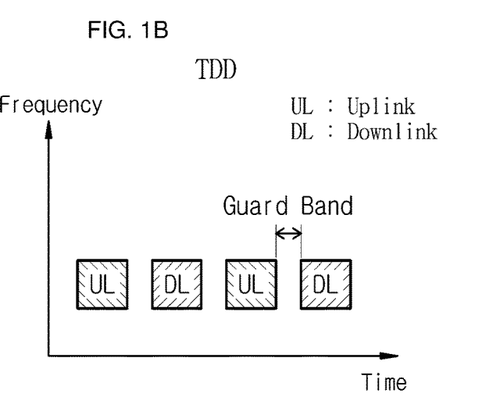

Wireless duplex schemes in the 5G network are categorized into a frequency division duplex (FDD) scheme shown in a left portion of FIG. 1 in which downlink (DL) and uplink (UL) signals transmitted between a base station and a terminal are separated by sending respective signals through separate frequency bands and a time division duplex (TDD) scheme shown in a right portion of FIG. 1 in which the downlink and uplink signals are separated by sending respective signals during separate time slots.

In a FDD system, power detection is easy in receiving parties since the downlink and uplink signals are not separated in the time domain and are emitted in constant intensities by transmitting parties. However, a TDD system may show a high technical difficulty in the power detection since the downlink and uplink signals are transmitted separately in the time domain through a common frequency band and the power detection requires an accurate synchronization between the base station and the terminal and a precise estimation of the durations of the time slots.

Figure 2:
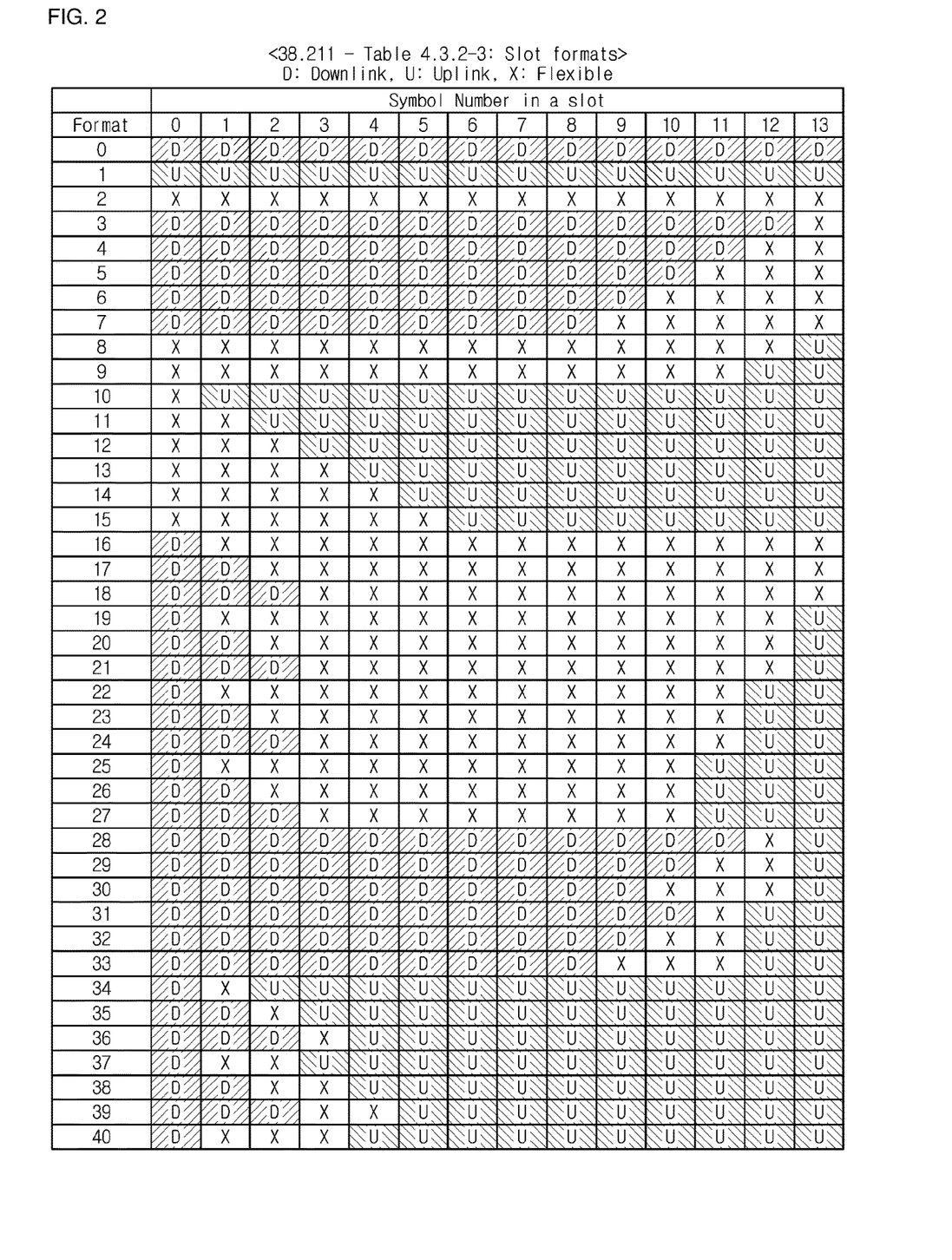
FIGS. 2 and 3 illustrate sixty four slot configuration patterns available as transmission resources.
Figure 3:
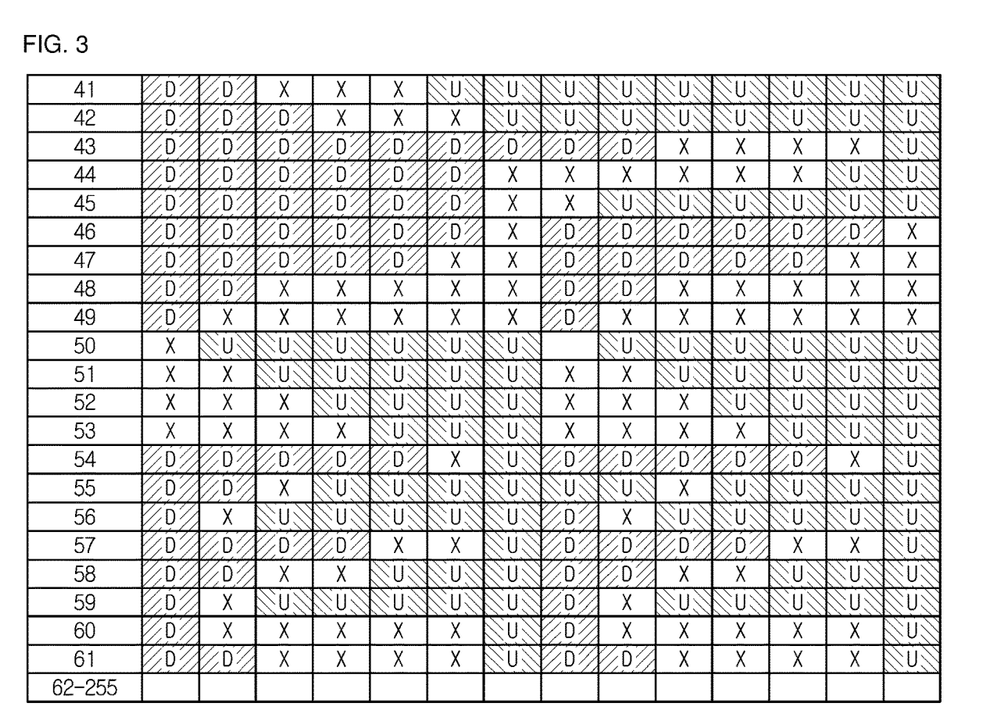
Figure 4:
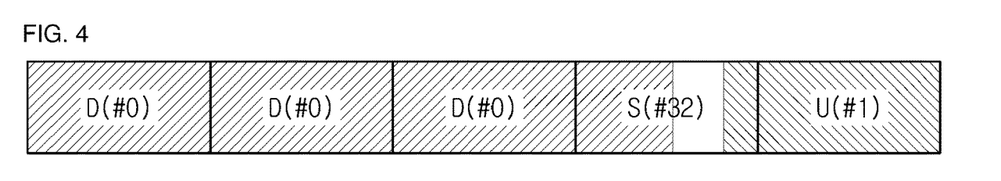
FIG. 4 illustrates a TDD time slot configuration in a 3.5 GHz band.

3GPP TS 38.211 standard for 5G; NR; Physical channels and modulation published by European Telecommunications Standards Institute (ETSI) defines sixty four (0~63) slot configuration patterns shown in FIGS. 2 and 3. In case of Korea, it has been legislated to adopt 4:1 configuration of 'DDDSU', shown in FIG. 4, for a TDD time slot configuration in a 3.5 GHz band and to allow the carriers to use 32-th pattern format in a S-slot shared between the carries.

Meanwhile, in order to enhance the quality of services cost-effectively in a coverage of the base station, an RF repeater which amplifies a signal received from the base station and transmit an amplified signal the terminal is deployed in coverage holes such as a geographical non-line-of-sight propagation area, and in-building and underground area where signals received directly from the base station signals may be weak.

Figure 5:
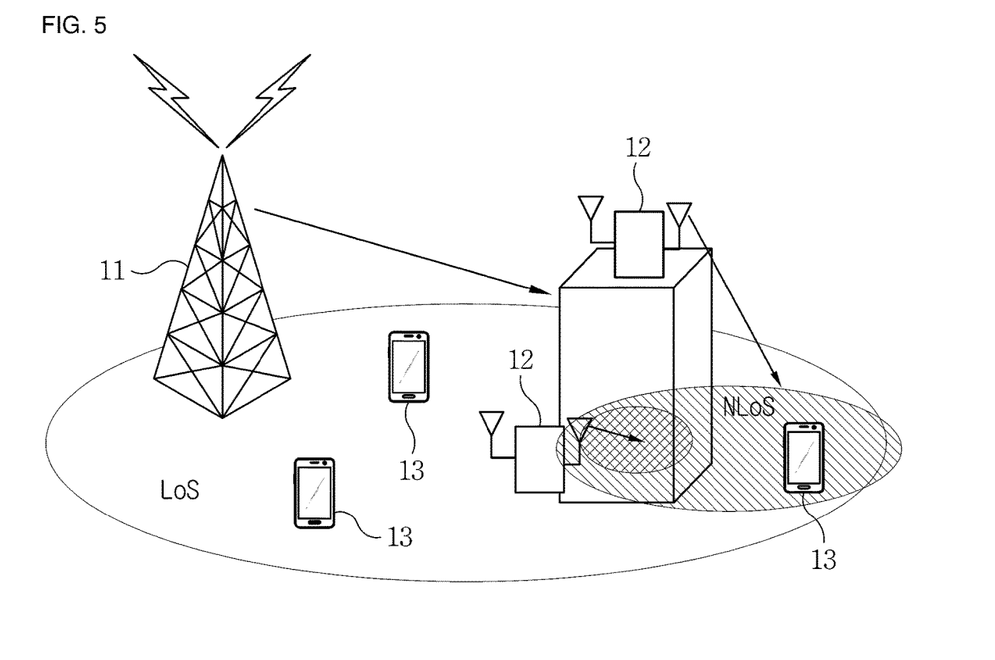
FIG. 5 illustrates a difference in a signal separation scheme in the mobile communications system.

As shown in FIG. 5, in the FDD system, the RF repeater can easily separate the downlink and uplink signals since the signals are transmitted at different frequency bands. In the TDD system employing the RF repeater, however, a precise synchronization between the downlink and uplink signals for the separation of the signals as mentioned above since the RF repeater uses the same frequency band for the downlink and uplink signals.

A formation of service holes is expected to increase in the 5G network because the 5G network uses a frequency band of 3.5 GHz or 28 GHz band which is higher than 800 MHz~2.6 GHz bands used in conventional 2G, 3G, or 4G systems, which will increase a radio wave loss. The increase of the service holes in the geographical non-line-of-sight propagation area, in-building and underground area, and a subway may deteriorate the quality of services. Therefore, it is expected that the need for a 5G radio repeater that can replace a 5G base station equipment investment-efficiency in the service holes will increase instead of installing the expensive and large 5G base station equipments in the service holes. In addition, a function of automatically setting the system for itself without an intervention of a maintenance operator is needed in the RF repeater in consideration of the expectation of the increase in the number of the 5G RF repeaters.

SUMMARY

To solve the above problem, provided are an apparatus and method of automatically setting a gain of a RF repeater for itself.

According to an aspect of an exemplary embodiment, an apparatus for setting a gain of a RF repeater includes: a synchronization signal power calculator configured to determine an average received power level of a synchronization signal received over a predetermined number of times as a synchronization signal power; a downlink power calculator configured to calculate a downlink input power according to a power ratio of synchronization signal to data channel signal based on the synchronization signal power; and a downlink gain setting unit configured to calculate a downlink gain by subtracting the downlink input power from a downlink output power determined by hardware specifications to set the downlink gain.

The apparatus may further include: an uplink gain setting unit configured to set a uplink gain of the RF repeater to be equal to the downlink gain.

The downlink power calculator may calculate a data channel signal power based on the synchronization signal power and the power ratio of synchronization signal to data channel signal, and calculate the downlink input power according to an equation: $P\_DL\_Input = P\_SSB + P\_PDSCH$. Here, 'P_DL_Input' denotes the downlink input power, 'P_SSB' denotes the synchronization signal power, and 'P_PDSCH' denotes the data channel signal power.

The synchronization signal may be a synchronization signal block (SSB).

According to an aspect of another exemplary embodiment, a method of setting a gain of a RF repeater includes:

determining, by a synchronization signal power calculator, an average received power level of a synchronization signal received over a predetermined number of times as a synchronization signal power; calculating, by a downlink power calculator, a downlink input power according to a power ratio of synchronization signal to data channel signal based on the synchronization signal power; and calculating, by a downlink gain setting unit, a downlink gain by subtracting the downlink input power from a downlink output power determined by hardware specifications to set the downlink gain.

The method may further include: setting, by a uplink gain setting unit, a uplink gain of the RF repeater to be equal to the downlink gain.

The operation of calculating the downlink input power may include: calculating, by the downlink power calculator, a data channel signal power based on the synchronization signal power and the power ratio of synchronization signal to data channel signal; and calculating, by the downlink power calculator, the downlink input power according to an equation: P_DL_Input=P_SSB+P_PDSCH. Here, 'P_DL_Input' denotes the downlink input power, 'P_SSB' denotes the synchronization signal power, and 'P_PDSCH' denotes the data channel signal power.

The synchronization signal may be a synchronization signal block (SSB).

According to a RF repeater of the present disclosure, a downlink system gain and a uplink system gain may be automatically set based on a synchronization signal, i.e., a synchronization signal block received from a base station. Accordingly, an operator does not need to set the gain of the repeater manually, and the present disclosure may facilitate a network construction in a service hole and reduce an operating cost.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. In the following description and the accompanied drawings, detailed descriptions of well-known functions or configuration that may obscure the subject matter of the present disclosure will be omitted for simplicity. Also, it is to be noted that the same components are designated by the same reference numerals throughout the drawings.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure are not intended to limit the technical idea of the present disclosure. Therefore, it should be understood that there may exist various equivalents and modifications which may substitute the exemplary embodiments at the time of filing of the present application.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure.

When a component is referred to as being "connected" or "coupled" to another component, it means that the component is connected or may be connected logically or physically to the other component. In other words, it is to be understood that the component or may be connected or coupled to the other component indirectly through an object therebetween instead of being directly connected or coupled to the other component.

When a component is referred to as being "connected" or "coupled" to another component, it means that the component is connected or may be connected logically or physically to the other component. In other words, it is to be understood that the component or may be connected or coupled to the other component indirectly through an object therebetween instead of being directly connected or coupled to the other component.

Figure 6A:
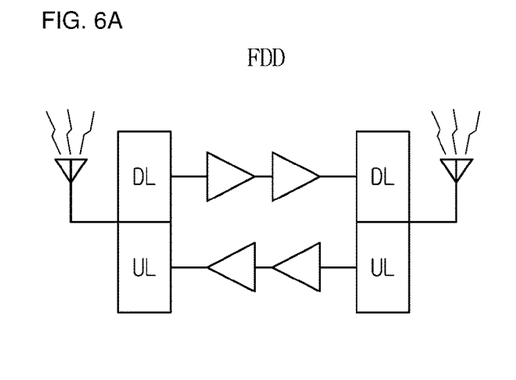
FIGS. 6A and 6B illustrate a mobile communications system to which an exemplary embodiment of the present disclosure is applicable.
Figure 6B:
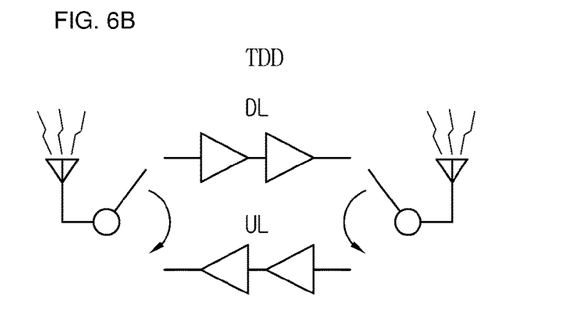
Figure 7:
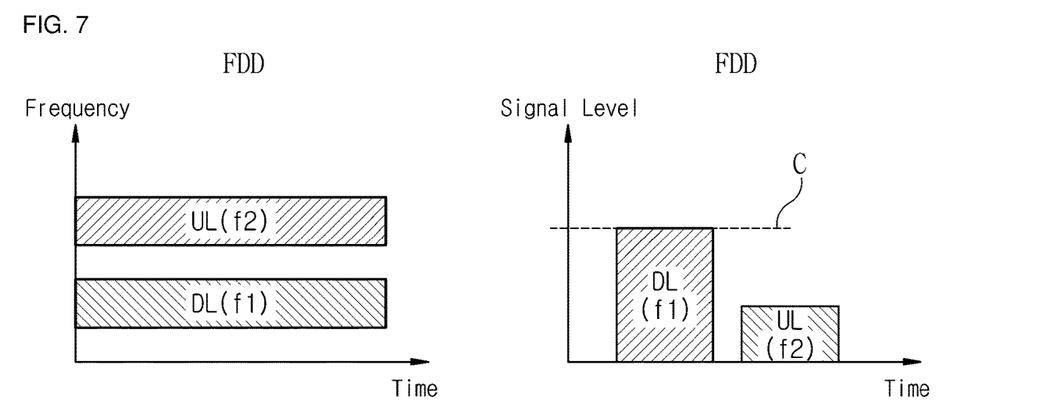
FIGS. 7 and 8 illustrate time and frequency allocation of uplink and downlink channels in FDD and TDD schemes for explaining a signal level detection.
Figure 8:
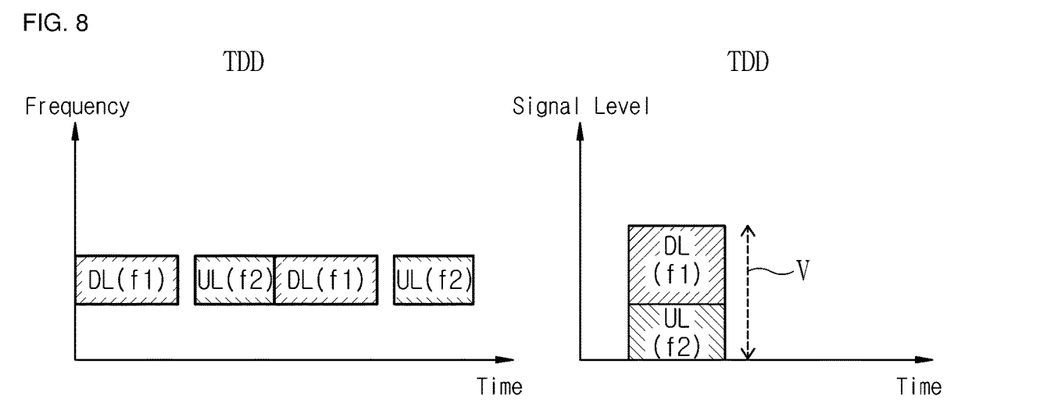
Figure 9:
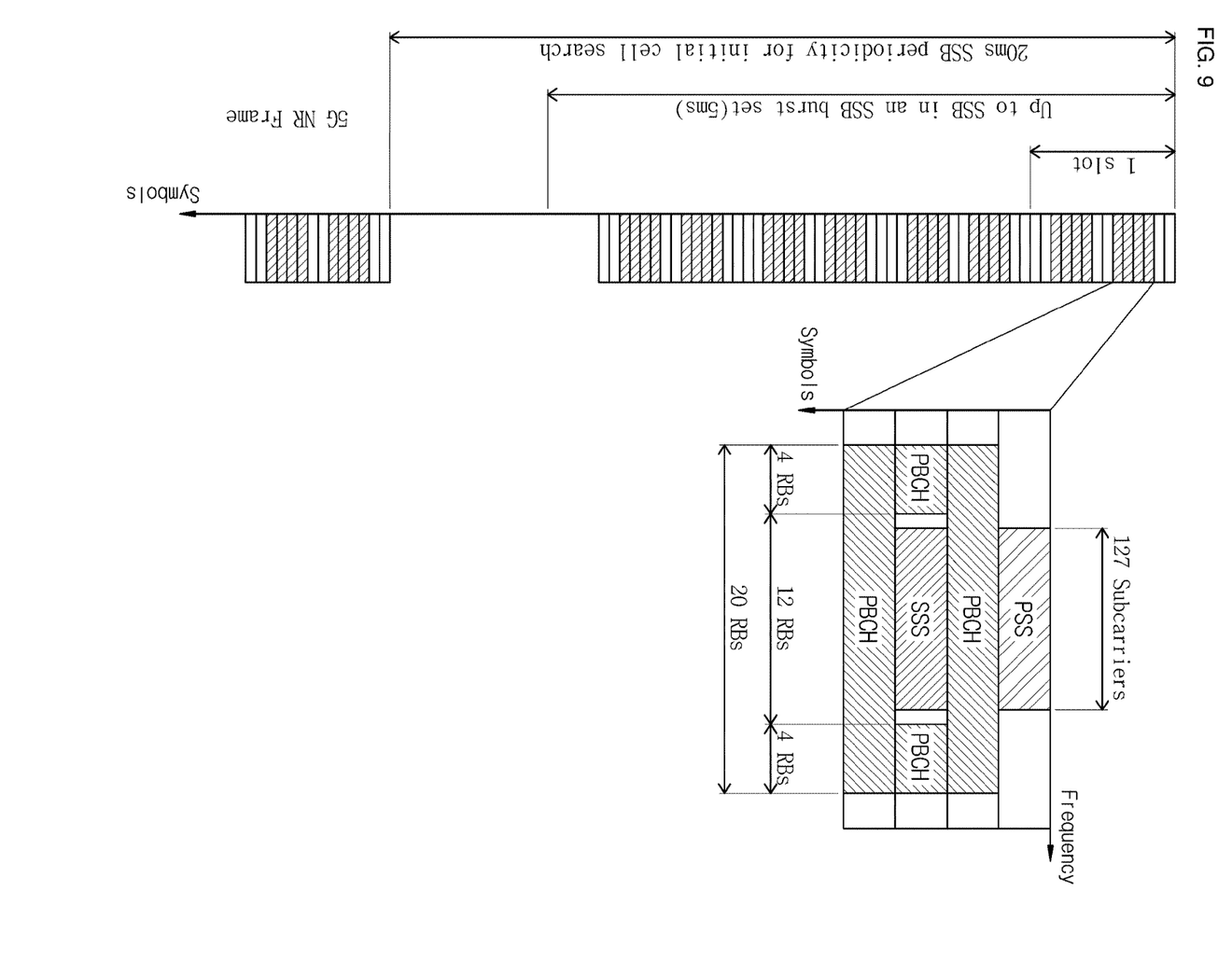
FIG. 9 is a view for explaining a synchronization signal used in an exemplary embodiment of the present disclosure.
Figure 10:
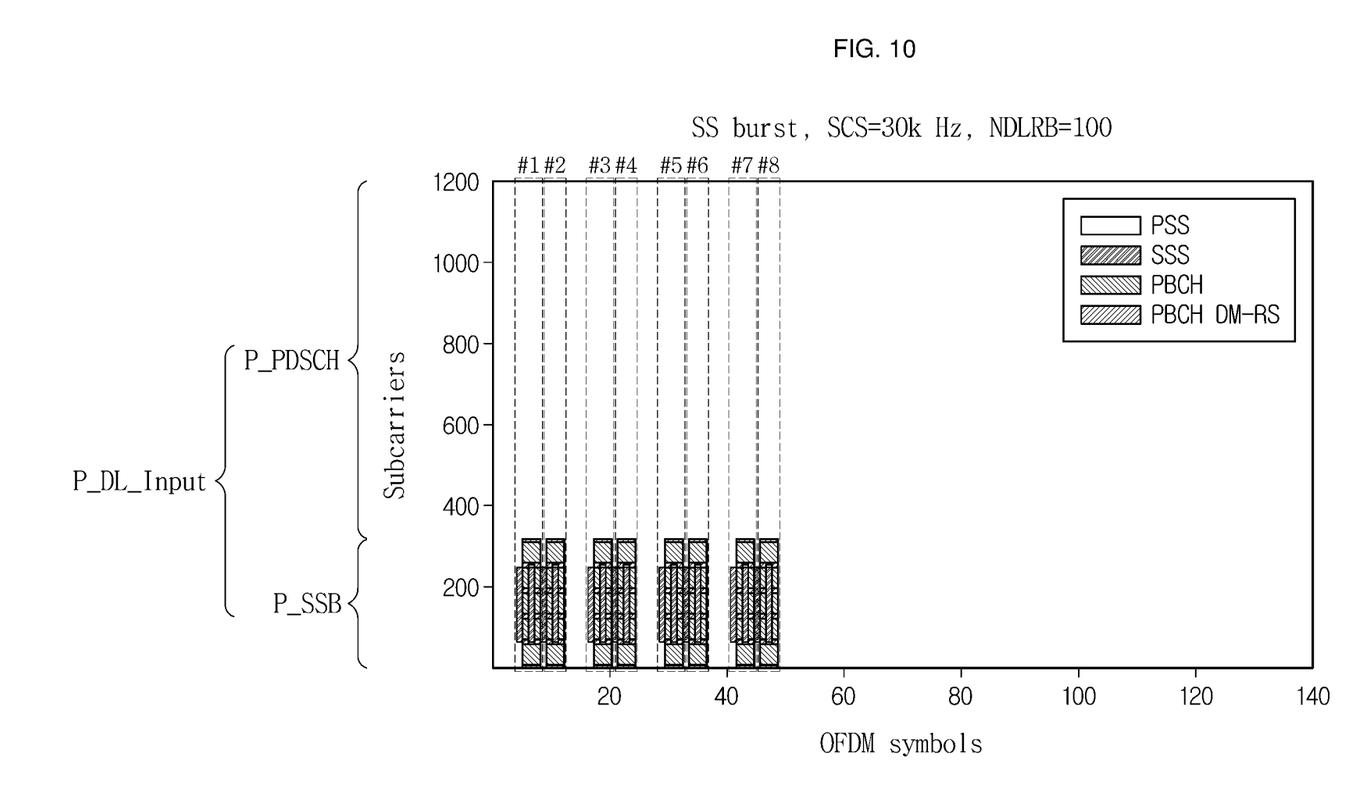
FIG. 10 is a view for explaining a power calculation method according to an exemplary embodiment of the present disclosure.

First, a mobile communication system to which an embodiment of the present disclosure is applied is described with reference to the drawings. FIG. 6 illustrates a mobile communications system to which an exemplary embodiment of the present disclosure is applicable. FIGS. 7 and 8 illustrate time and frequency allocation of uplink and downlink channels in FDD and TDD schemes for explaining a signal level detection. FIG. 9 is a view for explaining a synchronization signal used in an exemplary embodiment of the present disclosure. FIG. 10 is a view for explaining a power calculation method according to an exemplary embodiment of the present disclosure;

First, referring to FIG. 6, a mobile communications system according to an exemplary embodiment of the present disclosure includes a base station 11, a RF repeater 12, and a terminal 13. Here, the connections between the RF repeater 12, the base station 11, and the terminal 13 may be established based on wireless communications.

In particular, the RF repeater 12 may be installed in coverage holes such as a building, underground, subway, and so on in a non-line-of-sight propagation (NLOS) area. A downlink (DL) signal refers to a radio signal transmitted by the base station 11 to the terminal 13, and a uplink (UL) signal refers to a signal transmitted by the terminal 13 to the base station 11. The RF repeater 12 receives the downlink signal transmitted by the base station 11, amplifies such signal, and transmits an amplified signal to the terminal 13. Also, RF repeater 12 receives the uplink signal transmitted by the terminal 13, amplifies such signal, and transmits an amplified signal to the base station 11.

In case of a general frequency division duplex (FDD) scheme, the downlink signal transmitted by the base station 11 and the uplink signal transmitted by the terminal 13 may be transmitted simultaneously in a time domain through separate frequency bands as shown in a left portion of FIG. 7.

In such a FDD scheme, since the signal level may be constant with time as shown in a right portion of FIG. 7, the RF repeater 12 can detect the downlink signal in a relatively high level and easily determine an average power, a peak power, and the like. Based on determined properties, the RF repeater 12 can estimate a most probable attenuation value of a RF path and determine a system downlink gain to set a maximum downlink power. In case of the uplink signal, a uplink gain may be set to be equal to the downlink gain by setting the uplink gain based on the downlink attenuation value.

In a 5G system, however, a time division duplex (TDD) scheme has been chosen as a standard and deployed commercially in consideration that data traffic is asymmetrical and downlink traffic is much larger than uplink traffic. According to the TDD scheme, the downlink signal and the uplink signal are transmitted through a same frequency band and are separated in the time domain as shown in a left portion of FIG. 8. In the TDD scheme, however, the levels of the signals are not constant with time as shown in a right portion of FIG. 8. That is, the strength of the downlink signal is relatively large, the strength of the uplink signal is relatively small, and there is no signal for a guard band, and the strength of the uplink signal is relatively small. The severe fluctuation in an instantaneous signal level make it difficult to detect the 5G RF signal by a general power detection method and necessitates a sophisticated gain setup process in the RF repeater than the FDD scheme.

Meanwhile, in the 5G system, a synchronization between the base station 11 and the terminal 13 is essential for establishing a call connection between the base station 11 and the terminal 13. Thus, the base station 11 periodically broadcasts a synchronization signal, i.e., a synchronization signal block (SSB). The signal level of the synchronization signal block is maintained constant at a transmitter of the base station 11 regardless of traffic conditions. As shown in FIG. 9, the synchronization signal block includes a primary synchronization signal (PSS), a secondary synchronization signal (SSS), and a physical broadcast channel (PBCH). Upon receiving the synchronization signal block, the terminal 13 performs a timing synchronization in a frame/symbol unit, a frequency synchronization, a cell ID detection, and so on by using the primary synchronization signal (PSS) in a first hand and the secondary synchronization signal (SSS) in a second hand. The base station 11 transmits the synchronization signal block as an essential control signal for a basic synchronization between the base station 11 and the terminal 13 in every slot, and the basic call connection procedure for an interworking between the base station 11 and the terminal 13 is performed based on the synchronization signal block. Meanwhile, resources other than the synchronization signal block may be allocated as data channel signals, but such resources may or may not be allocated depending on a traffic load of the terminal 13. Moreover, even when the other resources are allocated, it may be difficult to detect the instantaneous power at a particular time since the power control is performed according to a change in the wireless environment of the terminal 13.

Therefore, the present disclosure uses the synchronization signal transmitted by the base station for the gain setup in the RF repeater. In detail, an accurate measurement of a signal received from the base station 11 is essential for setting an optimum downlink output power of the RF repeater 12 interfaced with the base station 11 in a wireless communication. The synchronization signal block, which is a synchronization signal, can be accurately measured because the signal is transmitted periodically and maintains a constant signal level while the data channel signals cannot be measured accurately because of the fluctuation in the signal level with the traffic. Thus, the RF repeater 12 uses the synchronization signal block transmitted by the base station 11 periodically at a constant signal level in setting up the gain.

Referring to FIG. 10, a downlink input power (P_DL_Input) at a moment when the synchronization signal block is broadcasted by the base station 11 is a sum of a synchronization signal power and a data channel signal power as summarized by Equation 1.

$$P\_DL\_Input = P\_SSB + P\_PDSCH \quad \text{[Equation 1]}$$

Here, 'P_DL_Input', which denotes the downlink input power and represents a maximum downlink power at the instant when the synchronization signal block is broadcasted by the base station 11, can be used for estimating the power of the signal input to the RF repeater 12. 'P_SSB' denotes the synchronization signal power that is a power of the synchronization signal block at the instant when the synchronization signal block is broadcasted. 'P_PDSCH' denotes the data channel signal power that is a power of the data channel signal PDSCH at the instant when the synchronization signal block is broadcasted by the base station 11. In addition, the base station 11 can set a ratio of powers of each physical channel, and can set and use a power ratio of synchronization signal to data channel signal P_SSB: P_PDSCH representing a ratio of the synchronization signal power P_SSB to the data channel signal power P_PDSCH. For example, the base station may set the power ratio of synchronization signal to data channel signal P_SSB: P_PDSCH to 1:9 (i.e., P_SSB:P_PDSCH=10%:90%=1:9) through a parameter setting. The base station 11 can provide this ratio information to the RF repeater 12 by a higher layer signal.

The RF repeater 12 may measure the synchronization signal power P_SSB through the synchronization signal block transmitted periodically by the base station 11 at a constant level. The RF repeater 12 may determine the data channel signal power P_PDSCH according to the power ratio of synchronization signal to data channel signal P_SSB:P_PDSCH based on the synchronization signal power P_SSB. Further, the RF repeater 12 may calculate the downlink input power P_DL_Input by summing the synchronization signal power P_SSB and the data channel signal power P_PDSCH according to the Equation 1 and automatically set an optimum downlink gain of the RF repeater 12.

Figure 11:
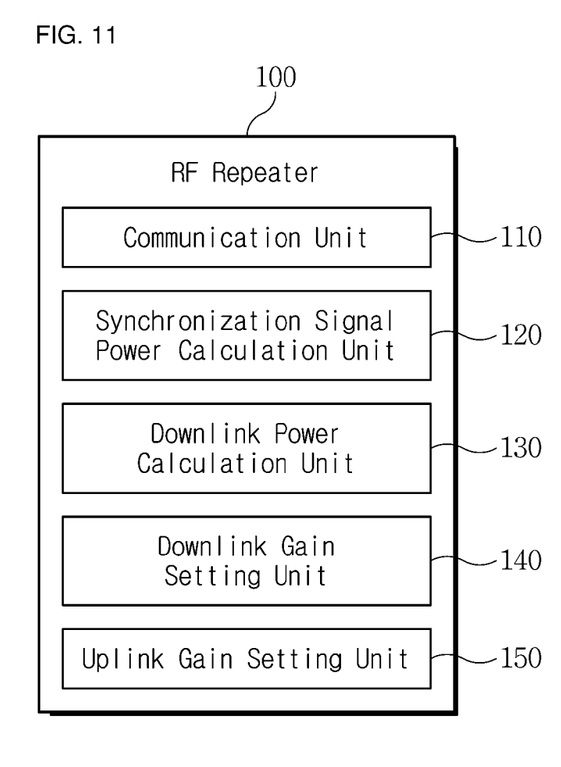
FIG. 11 is a block diagram of a RF repeater according to an exemplary embodiment of the present disclosure.

Next, a configuration of the RF repeater 12 according to an exemplary embodiment of the present disclosure will be described in more detail. FIG. 11 is a block diagram of the RF repeater 12 according to an exemplary embodiment of the present disclosure.

Referring to FIG. 11, the RF repeater 12 according to an exemplary embodiment of the present disclosure includes a communication unit 110, a synchronization signal power calculation unit 120, a downlink power calculation unit 130, a downlink gain setting unit 140, and an uplink gain setting unit 150.

The communication unit 110 enables the communications between the base station 11 and the terminal 13 and operates according to a TDD scheme. In particular, the communication unit 110 may detect a synchronization signal, (i.e., the synchronization signal block) transmitted by the base station 11.

The synchronization signal power calculation unit 120 calculates the synchronization signal power P_SSB. The synchronization signal power calculation unit 120 receives the synchronization signal (e.g., SSB) from the communication unit 110 a predetermined number of times or more and calculates an average of received power levels of the synchronization signal. That is, the synchronization signal power calculation unit 120 may receive the synchronization signal n times, measure the power levels of the received synchronization signal n times, and calculate the average of the power levels of the measured synchronization signal to determine the average as the synchronization signal power P_SSB. For example, the synchronization signal power P_SSB may be −50 dBm (10-5 mW).

The downlink power calculation unit 130 calculates the downlink input power P_DL_Input. As mentioned above, the base station 11 may set and use the power ratio of synchronization signal to data channel signal P_SSB:P_PDSCH. Accordingly, the downlink power calculation unit 130 may calculate the data channel signal power P_PDSCH according to power ratio of synchronization signal to data channel signal P_SSB:P_PDSCH based on the synchronization signal power P_SSB. Subsequently, the downlink power calculation unit 130 may calculate the downlink input power P_DL_Input by adding the synchronization signal power P_SSB and the data channel signal power P_PDSCH according to the Equation 1. For example, assuming that the average received power level of the synchronization signal, that is, the synchronization signal power P_SSB is 10-5 mW and the power ratio of synchronization signal to data channel signal P_SSB: P_PDSCH is 1:9, the downlink power calculation unit 130 may determine the downlink input power P_DL_Input as follows: P_DL_Input=1×P_SSB+9×P_SSB=1×10-5 mW+9×10-5 mW=10-4 mW (−40 dBm). Here, 9×P_SSB equals to the data channel signal power P_PDSCH.

The downlink gain setting unit 140 determines and sets the downlink system gain DL_Gain. The downlink gain setting unit 140 may calculate a difference between a downlink output power P_DL_Output, which is a maximum downlink output power implementable according to hardware specifications, and the calculated downlink input power P_DL_Input, and set the downlink system gain DL_Gain automatically. In other words, the RF repeater 12 may acquire the downlink system gain DL_Gain according to Equation 2.

$$DL\_Gain = P\_DL\_Output - P\_DL\_Input \quad \text{[Equation 2]}$$

Here, 'DL_Gain' denotes the downlink system gain. 'P_DL_Output' denotes the downlink output power which is the maximum downlink output power implementable according to the hardware specifications. That is, the maximum downlink output power P_DL_Output is determined according to the hardware specifications. Meanwhile, 'P_DL_Input' denotes the downlink input power that can be calculated as described above.

Assuming that the downlink output power P_DL_Output implementable according to the hardware specifications is +30 dBm, the downlink system gain DL_Gain would be +30 dBm−(−40 dBm)=+70 dBm according to the Equation 2.

The uplink gain setting unit 150 sets the uplink system gain. The RF repeater 12 operates under the TDD scheme, in which the uplink system gain may be set to be equal to the downlink system gain. In detail, in the TDD system, the uplink and downlink use the same frequency band as each other, and the same path losses occur between the uplink and downlink. Thus, the uplink gain setting unit 150 may set the uplink system gain to be equal to the downlink system gain. For example, the uplink gain setting unit 150 may set the uplink system gain to be +70 dB which is the same value as the downlink system gain as described above.

Figure 12:
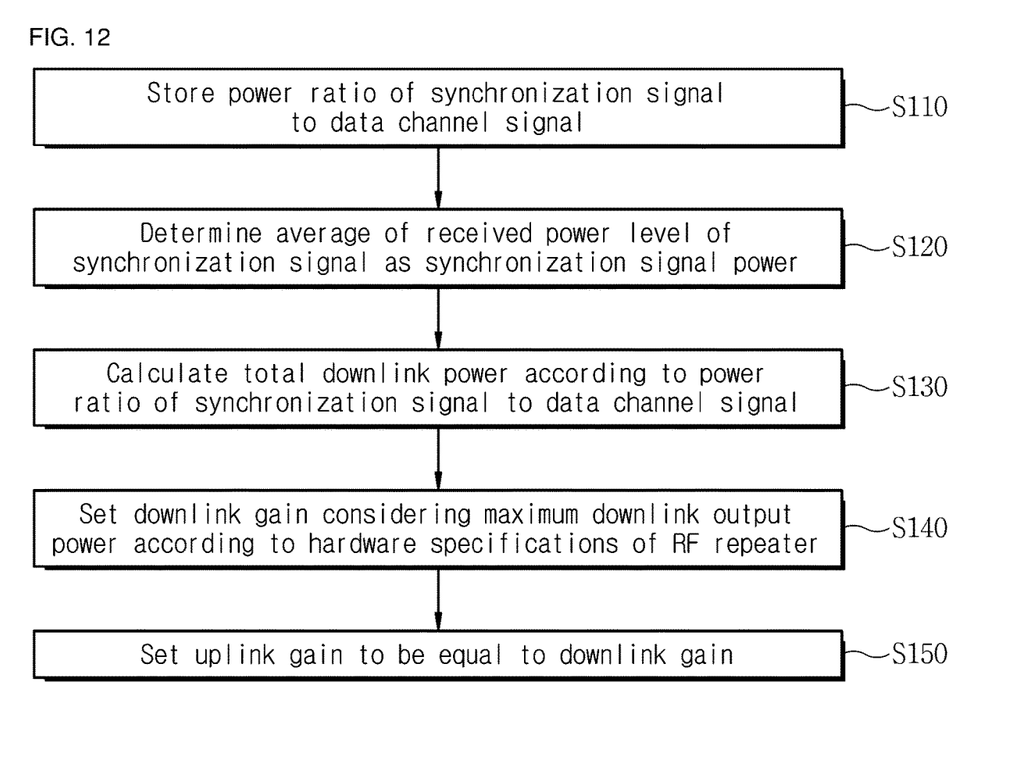
FIG. 12 is a flowchart illustrating a method of setting a gain of the RF repeater using a synchronization signal according to an exemplary embodiment of the present disclosure.

Next, a method for setting the gain of the RF repeater using the synchronization signal according to an exemplary embodiment of the present disclosure will be described. FIG. 12 is a flowchart illustrating the method of setting the gain of the RF repeater using the synchronization signal according to an exemplary embodiment of the present disclosure.

Referring to FIG. 12, it is assumed in step S110 that the RF repeater 12 has stored the power ratio of synchronization signal to data channel signal P_SSB:P_PDSCH set by the base station 11.

In operation S120, the synchronization signal power calculation unit 120 of the RF repeater 12 may receive the synchronization signal (e.g., SSB) from the communication unit 110 a predetermined number of times or more and calculate an average of received power levels of the synchronization signal to determine the synchronization signal power P_SSB. In other words, the synchronization signal power calculation unit 120 may receive the synchronization signal n times, measure the power levels of the received synchronization signal n times, and calculate the average of the power levels of the measured synchronization signal to determine the average as the synchronization signal power P_SSB. For example, the synchronization signal power P_SSB may be −50 dBm (10-5 mW).

In operation S130, the downlink power calculation unit 130 of the RF repeater 12 may calculate the data channel signal power P_PDSCH according to power ratio of synchronization signal to data channel signal P_SSB:P_PDSCH stored in the operation S110 based on the synchronization signal power P_SSB calculated in the operation S120, and calculate the downlink input power P_DL_Input by adding the synchronization signal power P_SSB and the data channel signal power P_PDSCH according to the Equation 1. For example, assuming that the average received power level of the synchronization signal, that is, the synchronization signal power P_SSB is 10-5 mW and the power ratio of synchronization signal to data channel signal P_SSB: P_PDSCH is 1:9, the downlink power calculation unit 130 may determine the downlink input power P_DL_Input as follows: P_DL_Input=1×P_SSB+9×P_SSB=1×10-5 mW+9×10-5 mW=10-4 mW (−40 dBm). Here, 9×P_SSB equals to the data channel signal power P_PDSCH.

In operation S140, the downlink gain setting unit 140 may calculate a difference between the maximum downlink output power P_DL_Output that is implementable according to hardware specifications and the downlink input power P_DL_Input calculated in the operation S130, and determine the downlink system gain DL_Gain by the difference according to the Equation 2 to set the downlink system gain DL_Gain automatically. For example, assuming that the downlink output power P_DL_Output implementable according to the hardware specifications is +30 dBm, the downlink system gain DL_Gain would be +30 dBm-(−40 dBm)=+70 dBm according to the Equation 2.

In operation S150, the uplink gain setting unit 150 may set the uplink system gain to be equal to the downlink system gain. In the TDD system, since the uplink and downlink use the same frequency band as each other and the same path losses occur between the uplink and downlink, the uplink system gain may be set to be equal to the downlink system gain. For example, the uplink gain setting unit 150 may set the uplink system gain to be +70 dB which is the same value as the downlink system gain.

According to a RF repeater of the present disclosure, a downlink system gain and a uplink system gain may be automatically set based on a synchronization signal, i.e., a synchronization signal block received from a base station. Accordingly, an operator does not need to set the gain of the repeater manually, and the present disclosure may facilitate a network construction in a service hole.

What is claimed is:

1. An apparatus for setting a gain of a radio frequency (RF) repeater for a time division duplex (TDD) scheme in which downlink signals and uplink signals are transmitted through a same frequency and at separate times, the apparatus comprising:
    a synchronization signal power calculator configured to determine an average received power level of a synchronization signal included in the downlink signals and received over a predetermined number of times as a synchronization signal power;
    a downlink power calculator configured to calculate a downlink input power of the downlink signals according to a power ratio of the synchronization signal to data channel signals included in the downlink signals and based on the synchronization signal power, wherein the downlink input power is a maximum downlink power for the downlink signals when the synchronization signal is broadcasted; and
    a downlink gain setting unit configured to calculate a downlink gain by subtracting the downlink input power from a maximum downlink output power determined by hardware specifications for the RF repeater to set the downlink gain.

2. The apparatus of claim 1, further comprising:
    an uplink gain setting unit configured to set a uplink gain of the RF repeater to be equal to the downlink gain.

3. The apparatus of claim 1, wherein the downlink power calculator calculates a data channel signal power based on the synchronization signal power and the power ratio of synchronization signal to data channel signal, and calculates the downlink input power according to an equation: P_DL_Input=P_SSB+P_PDSCH,
    wherein 'P_DL_Input' denotes the downlink input power, 'P_SSB' denotes the synchronization signal power, and 'P_PDSCH' denotes the data channel signal power.

4. The apparatus of claim 1, wherein the synchronization signal is a synchronization signal block (SSB).

5. A method of setting a gain of a radio-frequency (RF) repeater for a time division duplex (TDD) scheme in which downlink signals and uplink signals are transmitted through a same frequency and at separate times, the method comprising:
    determining, by a synchronization signal power calculator, an average received power level of a synchronization signal included in the downlink signals and received over a predetermined number of times as a synchronization signal power;
    calculating, by a downlink power calculator, a downlink input power of the downlink signals according to a power ratio of the synchronization signal to data channel signals included in the downlink signals and based on the synchronization signal power, wherein the downlink input power is a maximum downlink power for the downlink signals when the synchronization signal is broadcasted; and
    calculating, by a downlink gain setting unit, a downlink gain by subtracting the downlink input power from a maximum downlink output power determined by hardware specifications for the RF repeater to set the downlink gain.

6. The method of claim 5, further comprising:
    setting, by a uplink gain setting unit, a uplink gain of the RF repeater to be equal to the downlink gain.

7. The method of claim 5, wherein calculating the downlink input power comprises:
    calculating, by the downlink power calculator, a data channel signal power based on the synchronization signal power and the power ratio of synchronization signal to data channel signal; and
    calculating, by the downlink power calculator, the downlink input power according to an equation: P_DL_Input=P_SSB+P_PDSCH,
    wherein 'P_DL_Input' denotes the downlink input power, 'P_SSB' denotes the synchronization signal power, and 'P_PDSCH' denotes the data channel signal power.

8. The method of claim 5, wherein the synchronization signal is a synchronization signal block (SSB).

9. A non-transitory storage medium for storing instructions that are executed by at least one processor to set a gain of a radio-frequency (RF) repeater for a time division duplex (TDD) scheme in which downlink signals and uplink signals are transmitted through a same frequency and at separate times, wherein the instructions cause the at least one processor to:
    determine an average received power level of a synchronization signal included in the downlink signals and received over a predetermined number of times as a synchronization signal power;
    calculate a downlink input power of the downlink signals according to a power ratio of the synchronization signal to data channel signals included in the downlink signals and based on the synchronization signal power, wherein the downlink input power is a maximum downlink power for the downlink signals when the synchronization signal is broadcasted; and
    calculate a downlink gain by subtracting the downlink input power from a maximum downlink output power determined by hardware specifications for the RF repeater.

10. The non-transitory storage medium of claim 9, wherein the instructions cause the at least one processor to:

set an uplink gain of the RF repeater based on the downlink gain.

11. The non-transitory storage medium of claim 9, wherein the instructions cause the at least one processor, when calculating the downlink input power, to:
    calculate a data channel signal power based on the synchronization signal power and the power ratio of synchronization signal to data channel signal; and
    calculate the downlink input power according to an equation: $P\_DL\_Input = P\_SSB + P\_PDSCH$,
    wherein 'P_DL_Input' denotes the downlink input power, 'P_SSB' denotes the synchronization signal power, and 'P_PDSCH' denotes the data channel signal power.

12. The non-transitory storage medium of claim 9, wherein the synchronization signal is a synchronization signal block (SSB).

* * * * *